(12) United States Patent
Lai et al.

(10) Patent No.: US 8,983,996 B2
(45) Date of Patent: Mar. 17, 2015

(54) ASSISTED SEARCHING

(75) Inventors: Larry Lai, Cupertino, CA (US); Emre Velipasaoglu, San Francisco, CA (US); David (Ciemo) Ciemiewicz, Mountian View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/286,204

(22) Filed: Oct. 31, 2011

(65) Prior Publication Data

US 2013/0110863 A1 May 2, 2013

(51) Int. Cl.
*G06F 17/30* (2006.01)

(52) U.S. Cl.
CPC .... *G06F 17/30867* (2013.01); *G06F 17/30967* (2013.01)
USPC ................... 707/767; 707/E17.137

(58) Field of Classification Search
CPC ............ G06F 17/3064; G06F 17/3466; G06F 1/34661
USPC ............................ 707/767, E17.137, 999.002
See application file for complete search history.

(56) References Cited

U.S. PATENT DOCUMENTS

| | | | |
|---|---|---|---|
| 6,834,075 B2 * | 12/2004 | Wang | 375/143 |
| 7,570,943 B2 * | 8/2009 | Sorvari et al. | 455/414.1 |
| 7,743,047 B2 * | 6/2010 | White et al. | 707/710 |
| 7,774,339 B2 * | 8/2010 | White et al. | 707/722 |
| 7,962,463 B2 * | 6/2011 | Cava | 707/706 |
| 7,996,400 B2 * | 8/2011 | Morris et al. | 707/732 |
| 8,095,568 B2 * | 1/2012 | Nordahl | 707/797 |
| 8,117,208 B2 | 2/2012 | Chang et al. | |
| 8,122,011 B1 | 2/2012 | Garg et al. | |
| 8,171,021 B2 | 5/2012 | Guha et al. | |
| 8,176,069 B2 * | 5/2012 | Timm et al. | 707/767 |
| 8,239,461 B2 * | 8/2012 | Jones et al. | 709/206 |
| 8,572,100 B2 * | 10/2013 | Hamilton | 707/750 |
| 8,583,675 B1 | 11/2013 | Haahr et al. | |
| 8,589,395 B2 * | 11/2013 | Singh | 707/736 |
| 8,589,429 B1 * | 11/2013 | Thirumalai et al. | 707/766 |
| 8,606,786 B2 | 12/2013 | Rounthwaite et al. | |
| 8,694,483 B2 * | 4/2014 | Roulland et al. | 707/706 |
| 2004/0205449 A1 * | 10/2004 | Hayes | 715/500 |
| 2005/0125427 A1 * | 6/2005 | Dageville et al. | 707/100 |
| 2006/0112087 A1 * | 5/2006 | Smyth et al. | 707/3 |
| 2006/0242138 A1 * | 10/2006 | Brill et al. | 707/5 |
| 2007/0208691 A1 * | 9/2007 | Ramakrishnan | 707/2 |
| 2007/0266002 A1 * | 11/2007 | Chowdhury et al. | 707/2 |
| 2008/0027932 A1 * | 1/2008 | Brunner et al. | 707/6 |
| 2008/0243733 A1 * | 10/2008 | Black | 706/16 |
| 2008/0270356 A1 * | 10/2008 | Anderson et al. | 707/3 |
| 2008/0281817 A1 * | 11/2008 | White et al. | 707/6 |
| 2008/0306937 A1 * | 12/2008 | Whilte et al. | 707/5 |
| 2009/0006333 A1 * | 1/2009 | Jones et al. | 707/3 |
| 2009/0030876 A1 * | 1/2009 | Hamilton | 707/3 |

(Continued)

OTHER PUBLICATIONS

Hopfgarner et al., "Search Trails using User Feedback to Improve Video Search", ACM, MM'08, Oct. 26-31, 2008, Vancouver, Canada, 2008, 10 pages.*

(Continued)

*Primary Examiner* — Phuong Thao Cao
(74) *Attorney, Agent, or Firm* — Berkeley Law & Technology Group, LLP

(57) ABSTRACT

Example systems, methods, apparatuses, or articles of manufacture, etc. are disclosed in connection with assisted search results.

19 Claims, 9 Drawing Sheets

(56) References Cited

U.S. PATENT DOCUMENTS

| | | | |
|---|---|---|---|
| 2009/0106224 A1* | 4/2009 | Roulland et al. | 707/5 |
| 2009/0248661 A1* | 10/2009 | Bilenko et al. | 707/5 |
| 2009/0259632 A1* | 10/2009 | Singh | 707/3 |
| 2009/0265341 A1* | 10/2009 | Nordahl | 707/5 |
| 2009/0281973 A1* | 11/2009 | Selinger et al. | 706/14 |
| 2009/0319466 A1* | 12/2009 | Liu et al. | 706/54 |
| 2010/0094862 A1* | 4/2010 | Bent et al. | 707/716 |
| 2010/0306229 A1* | 12/2010 | Timm et al. | 707/767 |
| 2011/0093488 A1 | 4/2011 | Amacker et al. | |
| 2011/0106799 A1* | 5/2011 | Barkai et al. | 707/732 |
| 2011/0153528 A1 | 6/2011 | Bailey et al. | |
| 2011/0191364 A1 | 8/2011 | LeBeau et al. | |
| 2011/0202522 A1* | 8/2011 | Ciemiewicz et al. | 707/711 |
| 2011/0264673 A1* | 10/2011 | White et al. | 707/750 |
| 2011/0289068 A1* | 11/2011 | Teevan et al. | 707/709 |
| 2011/0307320 A1* | 12/2011 | Tangney et al. | 705/14.41 |
| 2012/0036123 A1* | 2/2012 | Hasan et al. | 707/723 |
| 2012/0047145 A1 | 2/2012 | Heidasch | |
| 2012/0166438 A1* | 6/2012 | Wu et al. | 707/737 |
| 2012/0174158 A1* | 7/2012 | Mowrey et al. | 725/40 |
| 2012/0259851 A1* | 10/2012 | Jia et al. | 707/737 |
| 2012/0259871 A1* | 10/2012 | Holmes et al. | 707/753 |
| 2012/0260185 A1* | 10/2012 | Choc et al. | 715/738 |
| 2012/0265779 A1 | 10/2012 | Hsu et al. | |

OTHER PUBLICATIONS

Bailey et al., "Mining Historic Query Trails to Label Long and Rare Search Engine Queries", ACM Transaction on the Web, vol. 4, No. 4, Article 15, Sep. 2010, 27 pages.*

Singla et al., "Studying Trailfinding Algorithms for Enhanced Web Search", ACM, SIGIR' 10, Jul. 19-23, 2010, Genava, Switzerland, pp. 443-450 (8 pages).*

Bruza et al., "Interactive Internet Search: Keyword, Directory and Query Reformulation Mechanism Compared", ACM, SIGIR 2000, Athens, Greece, 2000, pp. 280-287 (8 pages).*

Liu, Y., et al., "How do users describe their information need: Query recommendation based on snippet click model", in Expert System with Applications, 2011, 10 pages.*

Bilenko, M., et al., "Mining the Search Trails of Surfing Crowds: Identifying Relevant Websites from User Activity", WWW 2008, Apr. 21-25, 2008, Beijing, China, 10 pages.*

White, R.W., et al., "Assessing the Scenic Route: Measuring the Value of Search Trails in Web Logs", SIGIR'10, Jul. 19-23, 2010, Geneva, Switzerland, 8 pages.*

White, R.W., et al., "Leveraging Popular Destinations to Enhance Web Search Interaction", ACM Transactions on the Web, vol. 2, No. 3, Article 16, Publication date: Jul. 2008, 30 pages.*

L. Suganya, et al., "Efficient Semantic Similarity Based FCM for Inferring User Search Goals with Feedback Sessions," International Journal of Computer Trends and Technology (IJCTT) vol. 4, Issue 9, Sep. 2013, 6 pages).

U.S. Appl. No. 13/335,692, filed Dec. 22, 2011, 47 Pages.

U.S. Appl. No. 13/335,692 / Notice to File Missing Parts, Mailed Jan. 10, 2012, 5 Pages.

U.S. Appl. No. 13/335,692 / Applicant Response to Notice to File Missing Parts, filed Mar. 12, 2012, 12 Pages.

U.S. Appl. No. 13/335,692 / Filing Receipt, Mailed Mar. 20, 2012, 3 Pages.

U.S. Appl. No. 13/335,692 / Filing Receipt, Mailed Mar. 26, 2012, 3 Pages.

U.S. Appl. No. 13/335,692 / Non-Final Rejection, Mailed Mar. 8, 2013, 13 Pages.

U.S. Appl. No. 13/335,692 / Amendment, filed Jun. 10, 2013, 13 Pages.

U.S. Appl. No. 13/335,692 / Notice of Publication, Mailed Jun. 27, 2013, 1 Page.

U.S. Appl. No. 13/335,692 / Final Rejection, Mailed Aug. 1, 2013, 18 Pages.

U.S. Appl. No. 13/335,692 / Request for Continued Examination, filed Nov. 1, 2013, 19 Pages.

U.S. Appl. No. 14/144,250, filed Dec. 30, 2013, 58 pages.

U.S. Appl. No. 13/335,692 / Non-Final Office Action, mailed Mar. 10, 2014, 22 pages.

U.S. Appl. No. 13/335,692 / Response to Non-Final Office Action, mailed Jun. 10, 2014, 18 pages.

U.S. Appl. No. 13/335,692 / Final rejection, mailed Jul. 28, 2014, 23 pages.

U.S. Appl. No. 13/335,692 / Response after Final Rejection, mailed Sep. 30, 2014, 23 pages.

U.S. Appl. No. 13/335,692 / Advisory Action, mailed Oct. 20, 2014, 4 pages.

U.S. Appl. No. 13/335,692 / Request for Continued Examination, mailed Oct. 28, 2014, 23 pages.

U.S. Appl. No. 14/144,250 / Filing receipt and Notice to File Missing Parts, mailed Jan. 15, 2014, 5 pages.

U.S. Appl. No. 14/144,250 / Response to Notice to File Missing Parts, mailed Feb. 4, 2014, 7 pages.

U.S. Appl. No. 14/144,250 / Updated Filing Receipt, mailed Feb. 11, 2014, 3 pages.

* cited by examiner

ASSISTED SEARCHING

BACKGROUND

1. Field

The subject matter disclosed herein relates to searching.

2. Information

Humans continue to generate content, which may include, by way of example, but not limitation, textual content, image content, audio content, video content, or combinations thereof, etc. Collecting, storing, organizing, or accessing content may be problematic due at least in part to the amounts becoming available.

To facilitate identification or retrieval, a search resource, such as a search engine, may be provided. A search resource may organize or index content included in large repositories. For example, a user may access a search engine by using a browser executed by a client device. Typically, over a network, the client device is able to communicate with one or more servers that have organized or indexed large amounts of content. A search resource, such as a search engine, may return one or more search results that are based, at least in part, on a search query that may comprise one or more search terms.

Unfortunately, if a search query is not formulated appropriately, a search resource may not locate content of interest. Consequently, there are ongoing needs for search resources, for example, to improve search results.

BRIEF DESCRIPTION OF DRAWINGS

Non-limiting and non-exhaustive aspects are described with reference to the following figures, wherein like reference numerals refer to like parts throughout the various figures, unless context indicates otherwise.

DETAILED DESCRIPTION

Figure 1:
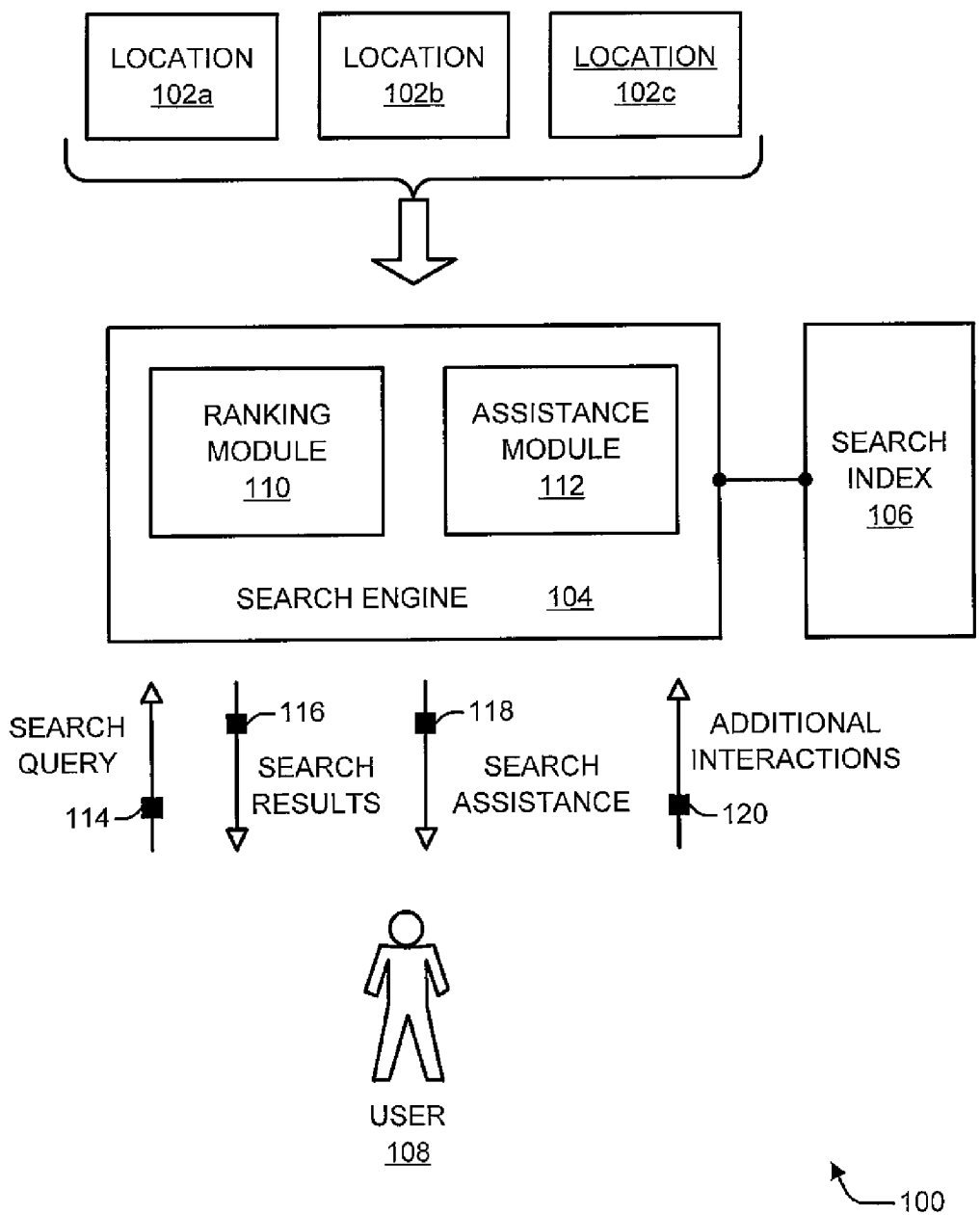
FIG. 1 is a schematic diagram of an example situation in which query recommendations assist a search query, such as in accordance with an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, systems, or technologies generally that may be known by a person of ordinary skill in the relevant art have not been described in detail so as not to obscure claimed subject matter.

A client device may be employed to display a search interface, such as via a browser, for example. Typically, a search interface, such as for a searching resource, including a search engine, associated with one or more servers, for example, may be accessed via a network, such as the Internet, for example, using a browser, such as a web browser. For example, a user may enter a search query comprising one or more search terms to execute a search using the search engine. A search resource, such as a search engine, may return one or more search results. However, depending at least in part upon the search query, it may be that none of the search results are of interest. To continue searching, typically, a request for additional search results may be made based at least partially on one or more earlier-entered search terms or a search may be refined by entering one or more different search terms. However, at some point, a search may be abandoned if the user, for example, in unable to locate search results of interest after several attempts.

To facilitate searching, a search resource, such as a search engine, may provide one or more query recommendations, also referred to as a query suggestion, a search suggestion, or simply a suggestion, intended to assist a user to obtain search results of interest.

Communication networks, such as local, wide-area, distributed, etc. networks, may provide access to large repositories of stored content. As suggested above, one example comprises the Internet, which has become practically ubiquitous as a source for or as a repository of stored content. The "World Wide Web" (WWW) may comprise at least a portion of the Internet. By way of example, but not limitation, some embodiments are described below in relation to searching the WWW. However, claimed subject matter is not limited in this respect. Instead, embodiments may be implemented with regard to any one of a host of other possible communication networks, including combinations of networks.

To provide access to content via a communication network, such as the WWW, tools or services may be provided that facilitate searching of a large amount of content in a reasonably efficient manner. For example, service providers, such as a search engine provider, may enable users to search the WWW or another communication network.

A variety of types of content may be made available via the WWW. Examples include text, images, audio, video, games, interactive content, or combinations thereof, etc. Electronically available documents may comprise web pages, files, emails, movies or video clips, pictures, blog entries, or any combination thereof, etc., just to name a few examples. Likewise, electronically available documents may be formulated in accordance with a variety of different formats. Example formats may include, but are not limited to, HyperText Markup Language (HTML), Extensible Markup Language (XML), Portable Document Format (PDF), H.264/AVC, proprietary formats, MPEG, JPEG or combinations thereof, etc., just to name a few.

Regardless of format, type of content, etc., a search engine may be employed to identify and gain access to desired content, as previously described. Terms, such as, "search engine", "search provider", "search service", "search interface", or "search application", etc. may be used interchangeably, depending at least in part on context. In an example operative usage of a search engine, as previously described, a user may submit a search query via a browser to one or more servers capable of implementing the search engine. In response to a search query, a search engine may return multiple search results. To facilitate access to content that may be of interest, a search engine may rank multiple search results in accordance with an estimate of expected relevancy.

To further facilitate access to content that may be of interest, a search engine may also return one or more query recommendations to a user, referred to here as search assistance, as an assisted search, or as an assisted search query. A user may interact with a search result or a query recommendation by, for example, selecting it via some mechanism (e.g., conventionally a user may "clicking" on it by placing a cursor over the item and executing a mouse click, although various other approaches also exist and are included within the scope of claimed subject matter). Another search may be performed and search results may be returned based, at least in part, on selection of a query recommendation. Although selection of a search result may imply high perceived relevance, but it does not necessarily imply high utility or satisfaction. It may therefore be challenging at times to evaluate if search results, whether or not generated using an assisted search approach, may be interest or may improve efficiency in locating content of interest.

Providing query recommendations is a well-known technique for search assistance. Nearly all state of the art search engines provide query recommendations. However, approaches do not appear to have considered assistance efficiency, such as reducing time or effort to locate results of interest. Example metrics may include search suggestion click-through-rate (CTR), search query abandonment rate, or an editorial-type metric. Click-type metrics do not usually provide direct evidence of performance. For example, a high CTR may be undercut by a large correlation with a high abandonment rate. For example, users may "click" a query recommendation that may turn out to be a distraction rather than relevant or useful, introducing a potential bias in a metric using CTR. Editorial-type metrics may be designed to provide additional diagnostic information. However, editorial-type metrics may be overly subject specific, relatively costly or relatively slow. In practice, a limited set of query recommendations may be feasibly evaluated with a manual editorial-type metric. Consequently, it may not be affordable to employ editorial-type metrics in a comprehensive manner.

In contrast, search path-type metrics may provide advantages over these other approaches. For example, a search path-type metric may provide a measure of efficiency or, conversely, distraction. For example in an embodiment, a path-type metric may be generated based, at least in part, on lengths of chosen search paths. In one or more embodiments, for example, search session logs may be evaluated to identify alternate search paths to a destination and alternate paths may be compared to assess relative efficiency in arriving at the destination. A number of approaches are possible and claimed subject matter is not limited in scope to a particular approach. However, illustrative examples are provided.

For example, search queries may be characterized as having an initial or starting query and a destination location. In this context, this may be referred to as reachability of a destination location. Session logs may be evaluated to identify alternate search paths between a start, Q, designating an initiated search query, and a destination location, U, such as, for example, designating a uniform resource locator address, in one possible embodiment. Alternate search paths may be considered to be competitive in that users may traverse alternate paths from Q to U; however, some search paths may be more efficient than others. Likewise, alternate search paths may be partitioned into at least two types: assisted search paths or non-assisted search paths. Assisted search paths may comprise search paths that include traversing (e.g., clicking) one or more query recommendations along the search path. Non-assisted search paths may comprise search paths in which users do not traverse (e.g., click) a query recommendation. A search path length distribution or a time distribution for assisted search paths may be compared to a search path length distribution or time distribution for non-assisted search paths. Likewise, query recommendations corresponding to assisted search paths having a search path time or length distribution that is shorter than an average search path time or length for non-assisted search paths may be considered favorably, for example. Likewise, in an example embodiment, a destination location may be inferred from session logs based at least in part on a user dwell time. Of course, claimed subject matter is not limited in scope in this respect and other approaches are intended to be included within the scope of claimed subject matter. However, a period of time a user dwells on a location presented as part of search query results and selected by a user has been found to be reasonable. For example, without limitation, a threshold time of 100 seconds, as one illustrative example, may be employed.

In example embodiments, a search path-type metric may measure performance of one or more query suggestions. For example, as an illustrative example, a metric may be termed a "path gain/loss" (PGL) metric. To calculate a PGL metric, for example, lengths of assisted search paths may be compared to lengths for non-assisted search paths. For example, if an assisted search path has a shorter path time relative to non-assisted search path time, a gain count may be incremented to represent a gain for a clicked search suggestion. If, on the other hand, an assisted search path has a longer path time relative to non-assisted search path time, a loss count may be incremented to represent a loss for a clicked search suggestion. For example, averages for non-assisted search paths may be used in one embodiment. Gains or losses for assisted search paths may be accumulated, such as for multiple alternative search paths, as indicated by search logs, for example. A PGL metric value may be generated based, at least in part, on a gain count or a loss count that may be viewed as indicating efficiency of a query recommendation. Again, this is merely an illustrative example. For example, other embodiments are described in more detail later. It is, of course, intended that claimed subject matter include all such possible embodiments, but not be limited to these illustrative examples.

FIG. 1 is a schematic diagram of an example embodiment 100 in which one or more query suggestions or recommendations that correspond to a search query may be provided. As illustrated, embodiment 100 may include search engine 104, and index 106. Search engine 104 may include ranking module 110 and assistance module 112. Assistance module 112 may provide search assistance, such as one or more query recommendations, as described previously, for example. Ranking module 110 may rank search results in terms of relevance, also as described previously. Of course, modules 110 and 112 are provided merely for purposes of illustration. It is not necessary for a search engine to employ separate modules and, of course, claimed subject matter is not limited in scope in this matter; however, solely for purposes of discussion, it may be convenient to refer to modules. It is also noted that any one of multiple possible locations, such as 102a, 102b, and 102c, may comprise a destination location. Likewise, there may be other locations that are destinations not illustrated and other locations that are not destinations that are not illustrated. These are merely illustrative examples for purposes of discussion. For a search environment that pertains to or facilitates access to web locations, by way of example only, possibilities that are not illustrated may number in the millions, billions, or more.

For purposes of discussion, embodiment 100 is illustrated with respect to a search query, such as 114, search results, such as 116, search assistance, such as 118, and additional interactions, such as 120. Similarly, although a single ranking module 110 and a single suggestion module 112 are shown in FIG. 1, claimed subject matter is not limited in this respect. By way of example, but not limitation, search engine 104 may access or retrieve content available at locations 102 and may index the content to generate search index 106. As described previously, a search query 114 may be transmitted, such as via a browser executing on a client device, to one or more servers, coupled to the client device via a network. The servers may be capable of executing a search engine, for example. Search query 114 may produce search results as a result of execution of search index 106. Although search index 106 is shown as being separate from search engine 104, again, none the less, for purposes of convenient discussion, search index 106 may, of course, be fully or partially integrated with search engine 104. Search engine 104 may employ ranking module 110 to rank search results relative to one another in terms of relevance. A ranked set of search results may be transmitted to user 108 as search results 116, again via a network coupling a client device to one or more servers (not explicitly shown in FIG. 1) executing the search engine, for example.

For an example embodiment, search engine 104 may transmit one or more query recommendations, corresponding to search query 114, as search assistance 118. A query recommendation may be generated via any one of a number of approaches. For example, a query recommendation may correspond to a search query based, at least in part, on one or more terms of the search query, on a category of the search query, on search results that are returned responsive to the search query, or any combination thereof, etc., just to name a few examples. A query recommendation or search suggestion may comprise, by way of example, but not limitation, content that is capable of modifying an existing search query or set of search results, content that is capable of initiating a separate search query, or any combination thereof, etc. By way of example only, query suggestions of "San Francisco Giants", "San Francisco Restaurants", "San Francisco Jobs", or "Bay Area" may correspond to a search query for "San Francisco." However, claimed subject matter is not limited to any particular examples or example attributes for query recommendations or suggestions.

In an example embodiment, if a user selects a query recommendation, for example, a search based at least partially on the search suggestion may be performed. Of course, there are other possible actions by a user. Hence, in a search session, one or more additional interactions 120 may take place, such as after search query 114 has been submitted or after search results 116 have been returned. A search session may conclude, however, if a long period of inactivity occurs. It may be inferred that the user has, in effect, abandoned the search since no search results were of interest after a variety of interactions or attempts to locate content of interest.

Figure 2:
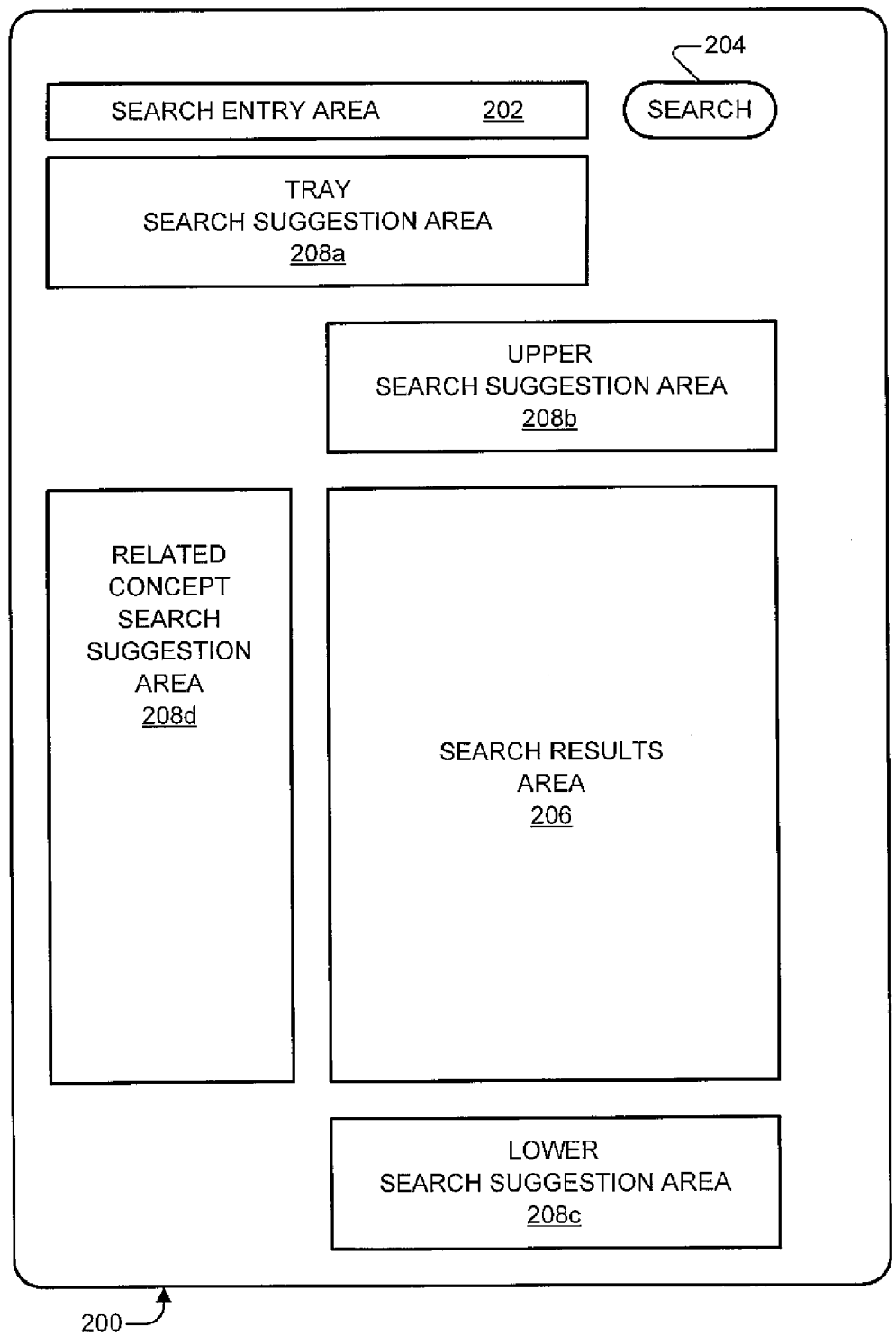
FIG. 2 is a diagram illustrating an example graphical user interface that may display search results or query suggestions for a search query, such as in accordance with an embodiment.

FIG. 2 depicts an example graphical user interface 200 that may be employed to display search results or query recommendations, such as for a search query, according to an embodiment. Of course, a variety of approaches are possible and FIG. 2 merely illustrates a possible approach without limitation. As illustrated, interface 200 may include a search entry area 202 or a search button 204. Interface 200 may also include search results area 206 or search suggestion areas, such as 208a, 208b, 208c, 208d, for example. Search results 116 (e.g., of FIG. 1) may be displayed at search results area 206, for example. Query recommendations or search suggestions 118 (e.g., of FIG. 1) may also be displayed, such as via one or more of search suggestion areas 208a, 208b, 208c, or 208d. Of course, content, layout, organization, or any combination thereof, etc. of user interface 200 may differ from that which is shown (e.g., in FIG. 2) or described herein. It is intended that any and all such potential variations are included within the scope of claimed subject matter.

In an example embodiment, via a browser, for example, interface 200 may be displayed on a display screen of a client device (not explicitly shown in FIG. 2), for example. Search entry area 202 permits entry of a search query. Search button 204 permits a search to be initiated. A search may be initiated, of course, by any one of a host of approaches. By way of example, but not limitation, examples include: activating a search, commanding that a search be undertaken, selecting a search button entering one or more search terms into a search entry area, pressing an "enter" or "return" key, or any combination thereof, etc.

Referring again to FIG. 2, a search may have been performed for a search query, or search results may be displayed at search results area 206. By way of example, but not limitation, a listing of at least a portion of a number of search results (not explicitly shown in FIG. 2) that may be considered relevant may be presented at search results area 206. Generally, search results include hyperlinks or locations that are capable of being accessed via a client device, such as a browser, through a network. Typically, in accordance with HTTP, for example, via a browser, if a user clicks a hyperlink presented as a search result, the client device browser is re-directed to another device on the network, such as a server, that may correspond to the location. At the location, content may be accessible, such as a web page, an electronic document, an image, an audio or video file, combinations thereof etc. If the accessed content is of interest, the location may comprise a destination location. For example, in one embodiment, if an associated dwell time for the location meets or exceeds 100 seconds, the location may be designated as a destination location for the search query that was initiated.

For one or more possible embodiments, query recommendations (e.g., search suggestions 118 of FIG. 1) may be displayed in one or more search suggestion areas, such as 208a, 208b, 208c, or 208d, for example. As shown, interface 200 may include tray search suggestion area 208a, upper search suggestion area 208b, lower search suggestion area 208c, related concept search suggestion area 208d, or any combination thereof, just to name a few examples. Query suggestions may be displayed a variety of ways. For example, for the embodiment of FIG. 2, search suggestions may be displayed in a single search suggestion area, such as upper search suggestion area 208b. Additionally or alternatively, for the embodiment of FIG. 2, search suggestions may be displayed in two or more search suggestion areas, such as 208a, 208b, 208c, or 208d. However, claimed subject matter is not limited to any particular approaches to displaying search suggestions.

In another example embodiment, one or more search suggestion areas (e.g., of search suggestion areas 208a, 208b, 208c, or 208d) may be associated with particular types of search suggestions. Example types of search suggestions may include, but are not limited to, search suggestions that, for example: (1) pertain to one or more particular subject categories (e.g., sports, entertainment, news, finance, real estate, finance, etc.), (2) are tailored to a particular user or a particular search history, (3) relate to a set of identified current trends, (4) relate to a particular set of variables or factors, (5) include terms synonymous with terms of the submitted search query, (6) relate to a particular search suggestion generation procedure, or any combinations thereof, etc. By way of example, search suggestions displayed at tray search suggestion area 208a may be associated with recent search trends, search suggestions displayed at upper search suggestion area 208b may be associated with terms that are synonymous with those of a submitted search query, search suggestions displayed at lower search suggestion area 208c may be associated with terms that match a category for terms of a submitted search query, or search suggestions displayed for related concept search suggestion area 208d may be associated with terms that are related to a concept of potential interest to a user or are inferred as of being of potential interest by terms of a submitted search query. However, claimed subject matter is not limited in these respects.

For an example embodiment, assistance module 112 (of FIG. 1) may evaluate query recommendations. For example, an evaluation as to whether to provide one or more particular query recommendations may be undertaken. Module 112 may also, in an embodiment, generate search suggestions, for example, as was described with reference to FIG. 1, for example. As previously described, of course, a search engine may integrate a capability to perform tasks, such as generating query recommendations or evaluating query recommendations, rather than employing a separate module. Likewise, in an example embodiment, multiple assistance modules or an equivalent may likewise be integrated in an embodiment.

A user may interact with search suggestions or search results, such as by selecting one or more of them via interface 200, as an example. A variety of approaches to making a selection electronically are possible and it is intended that any and all approaches be included within the scope of claimed subject matter. As merely a few possible examples, approaches may include: clicking a mouse, touching, such as with a finger or stylus, speaking voice commands, making gestures/motions, performing keyboard strokes, cursor manipulation, such as "hovering over" to make a selection, or any combination thereof, etc. If a search suggestion is selected, at least a portion of search results that are produced based, at least in part, on the selected search suggestion may be displayed, such as via interface 200, in an embodiment. Search results from a search query submitted via search entry area 202, initiated via selection of one or more search suggestions, or combinations thereof, etc. may be displayed at search results area 206 in an embodiment. Likewise, as described previously, for example, one or more search results that are displayed at search results area 206 may also be selected. Examples of approaches in which a selected search result may be displayed to a user, by way of example, but not limitation, may include, for example, via an existing window, via a bubble, via a separately generated window, such as a pop-up window, via a separately generated tab of an existing window, by replacing current content displayed at interface 200, via placement above or below current content displayed at interface 200, or any combination thereof, etc. If a selected search result is presented, a period of time during which a user may dwelling on a selected, displayed search result may be monitored.

Figure 3:
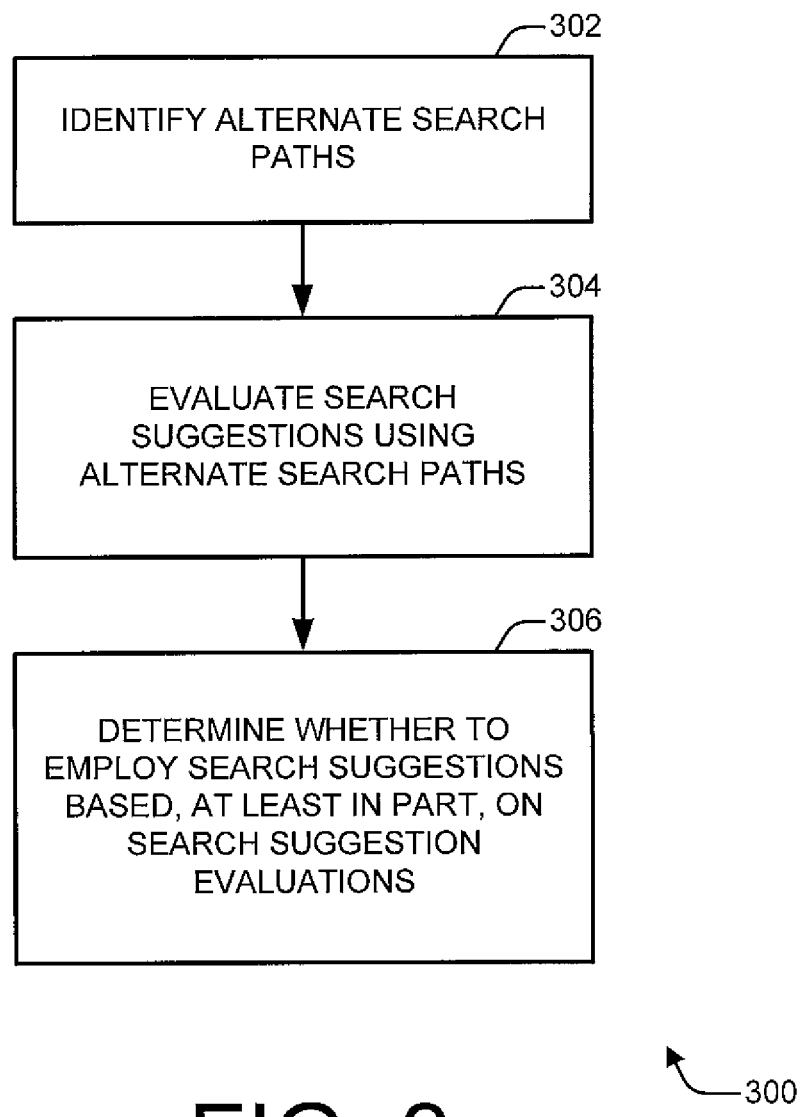
FIG. 3 is a flow diagram that illustrates an example method of implementing assisted searching according to an embodiment.

FIG. 3 is a flow diagram 300 that illustrates an example method for implementing an embodiment of assisted search. As illustrated, flow diagram 300 may include any of operational blocks 302-306. Although operations 302-306 are shown and described in a particular order, it should be understood that methods within the scope of claimed subject may employ an alternative order or alternative operations. Likewise, for an embodiment, operations of flow diagram 300 may be performed so as to be fully or partially overlapping with each other or other operations not illustrated. In an embodiment, one or more of operations 302-306 may be performed at least partially by one or more computing platforms such as distributed system of servers, as one example.

At operation 302, one or more search paths, in this example alternate search paths, between a starting query, Q, and a destination location, U, for example, may be identified. In an example embodiment, search or session logs may, for example, be employed in connection with search path identification. A search path may correspond, by way of example, but not limitation, to a set of selected results (e.g., clicks), including related interactions, between initiating a search query and reaching a destination location.

At operation 304, one or more search suggestions may be evaluated in connection with identified search paths, such as between Q and U. In an example embodiment, alternate search paths between Q and U may be evaluated based, at least in part, on a comparison of path length or duration, as an example. By way of example only, a metric may be generated, such as a PGL metric, for example.

At operation 306, it may be determined whether to provide one or more search suggestions, such as, for example, based, at least in part, on one or more search suggestion evaluations. In an example embodiment, providing a search suggestion may be based, at least partially, on whether the particular search suggestion comprises a lateral search suggestion or a competing search suggestion, for example. However, claimed subject matter is not limited in scope in this respect. As a general proposition, if a search suggestion has a reasonable chance of improving efficiency in terms of reaching a destination location, such as based, for example, at least in part, on an evaluation of alternatives, it may be desirable to provide the search suggestion or query recommendation.

Figure 4:
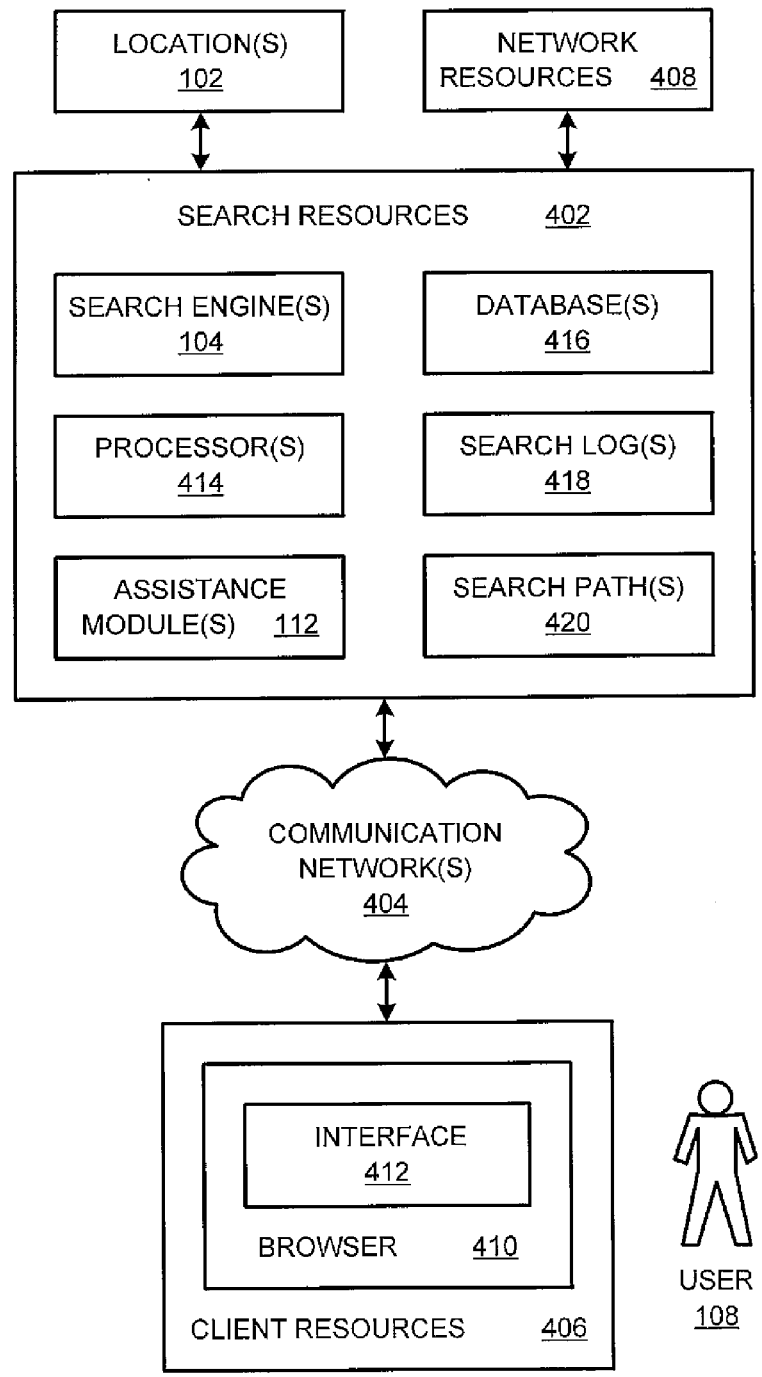
FIG. 4 is a schematic diagram of a system that may be employed to implement an embodiment of assisted searching.

FIG. 4 is a schematic diagram of an embodiment of a system that may be employed to implement an embodiment of an assisted search. As illustrated, embodiment 400 may include search resources 402, communication network(s) 404, and client resources 406. Likewise, network resources 408, and location 102 may be accessible. For example, location 102 may comprise a destination location. Search resources 402 may include search engine(s) 104, assistance module(s) 112, processor(s) 414, database(s) 416, search log(s) 418, search path(s) 420, etc. Likewise, these components may be integrated in various arrangements other than as illustrated. The illustration is provided for convenience of discussion. For example, search engine 104 may incorporate assistance module 112, as well as search logs and search paths, for example. Likewise, other components not illustrated may be included in an embodiment and illustrated components may be omitted from an embodiment. Client resources 406, which may, for example, comprise a client device, may, as illustrated, include interface 412 and browser 410. As discussed for search resources 402, client resources 406 may alternatively include more, fewer, or different components in other embodiments that are within the scope of claimed subject matter.

In an example embodiment, database(s) 416 may store index(s), such as 106 (e.g., of FIG. 1) or search log(s) 418. Search log(s) 418 may comprise a log of sessions in which search engine (s) 104 are accessed for executing search queries, such as accessed via a client device and network, for example. Typically, for example, as a result of communications between a client device requesting execution of search queries and one or more servers that execute requested search queries and serve search results to a requesting client device, search or session logs are available to search resource providers, for example. Search path(s) 420, such as alternative search paths for a query Q and destination U, for example, may therefore be identified using search log(s) 418.

Figure 5:
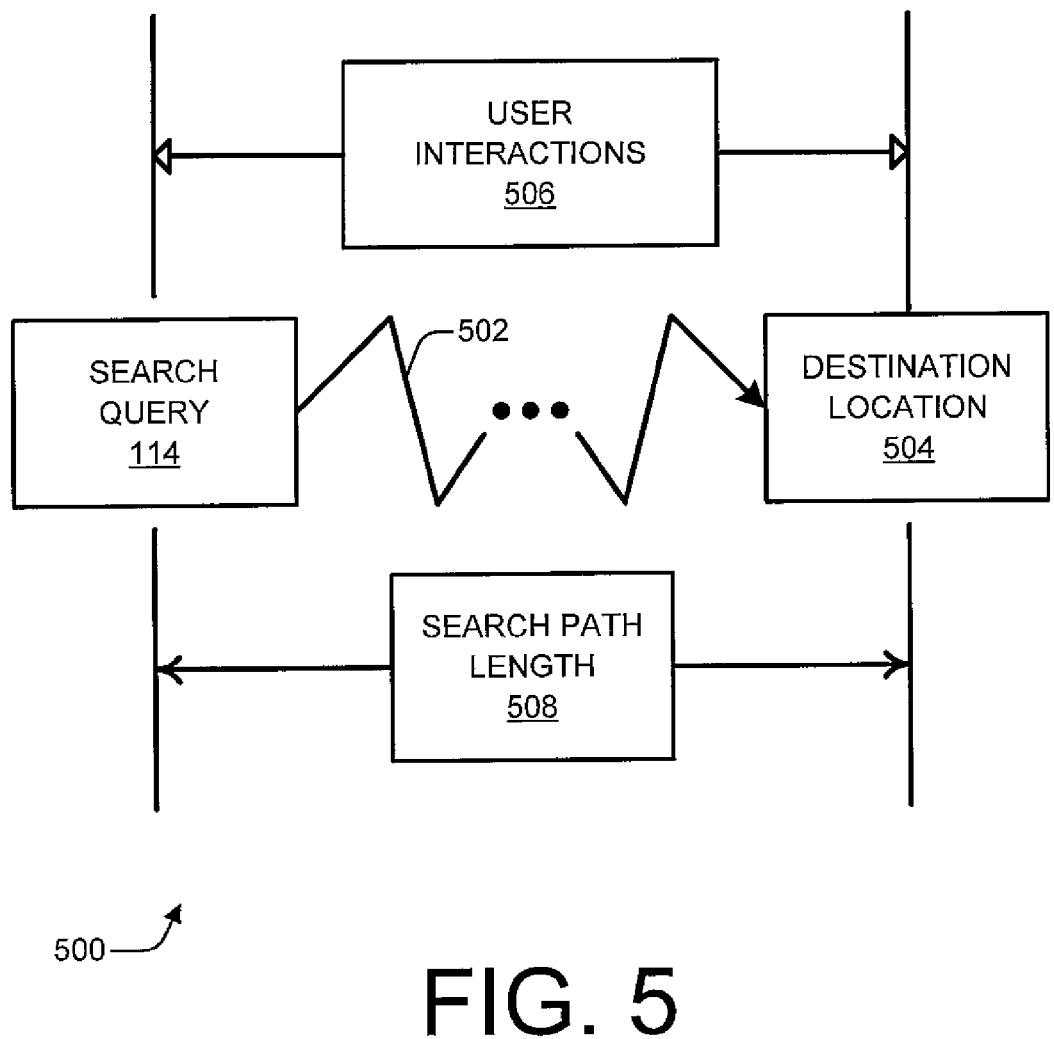
FIG. 5 is a schematic diagram illustrating an example situation involving a search query.

FIG. 5 is a schematic diagram illustrating an example situation 500 that may involve a search query, such as in accordance with an embodiment. As illustrated, example 500 may include search query 114, search path 502, a destination location 504, and user interactions 506. Search path 502 may have a search path length 508. By way of example only, a search path may begin with a search query, such as 114, or end with a destination location, such as 504.

A search path 502 may comprise a sequence of clicked or otherwise selected search results that are generated between initiation of search query 114 until reaching destination location 504. However, one or more interactions 506, which may, for example, include selecting or clicking a query recommendation, may be included along a search path to a destination location. In an embodiment, for example, search paths may be viewed as comprising algorithmic paths or reformulated paths. In an algorithmic path, search results that are served are selected, such as via clicking, to traverse a search path from initiating a search query to reaching a destination location. In a reformulated search path, a search query may be reformulated as the search path is traversed, such as by selecting a query recommendation or simply by submitting additional search queries, for example. Of course, claimed subject matter is not limited to particular examples of a search path, such as 502, or user interactions, such as 506.

As previously discussed, for an embodiment, a dwell time may be determined, by way of example only, via inference. For example, in one embodiment, a dwell time of 100 seconds or longer may result in designating a location as a destination location along a search path. A dwell time may be measured from, for example, an approximate time that a search result is selected. Thus, in an example embodiment, if a dwell time corresponding to a selected location meets (e.g., equals or exceeds) a dwell time threshold, the location may be identified as a destination location. However, claimed subject matter is not limited to any particular approach to identifying a destination location. The foregoing is merely an illustrative embodiment.

In an example embodiment, a search path 502 may be associated with a search path length 508, as indicated above. Determination of a search path length 508 may be based, at least in part, on search query 114 or destination location 504, for example. Search path length 508 may extend, by way of example but not limitation, from initiation of search query 114 to include the end of dwell time for destination location 504 in one possible embodiment. Of course, alternate embodiments are likewise possible, including excluding dwell time or including portions of dwell time that meet a threshold time, as examples. Likewise, in additional embodiments, a search path length 508 may include or exclude time attributable to user interactions that may occur between initiation of a search query and reaching a destination location, for example. It is intended that claimed subject matter include any and all such possible embodiments, whether or not provided as an illustrative example.

In an example embodiment, an initial search query that starts a search path may be identified from logs, for example. Likewise, as described, a destination location may be identified. A classifier, for instance, may be trained to identify a destination location, although claimed subject matter is not limited in scope to using a classifier. Likewise, aggregation of search paths corresponding to a query, Q, and a location destination, U, for example, may, in an embodiment, be evaluated to compute statistical estimators, such as mean, median, mode, variance, etc. for search path traversal time, for example.

Likewise, path traces may be identified. A path trace may track or indicate a sequence of locations selected or clicked, for example, such as from an initiated query to a destination location, for example. For a click event, for example, a search query, search results, and a selected search result, such as a hyperlink, for example, may be useful for evaluation of search paths, search results, query suggestions, etc. For example, alternative search paths may be identified and counted. Statistical estimators, such as for time duration for path traversal, may be computed. Likewise, abandoned search paths may also be identified. For example, reformulation of search queries multiple times without selecting a search result may be employed to infer abandonment of a search path. Therefore, to evaluate query recommendations, a variety of approaches, such as approaches in which search paths are identified and/or search path length or search path time is computed, may be employed in an example embodiment.

Figure 6:
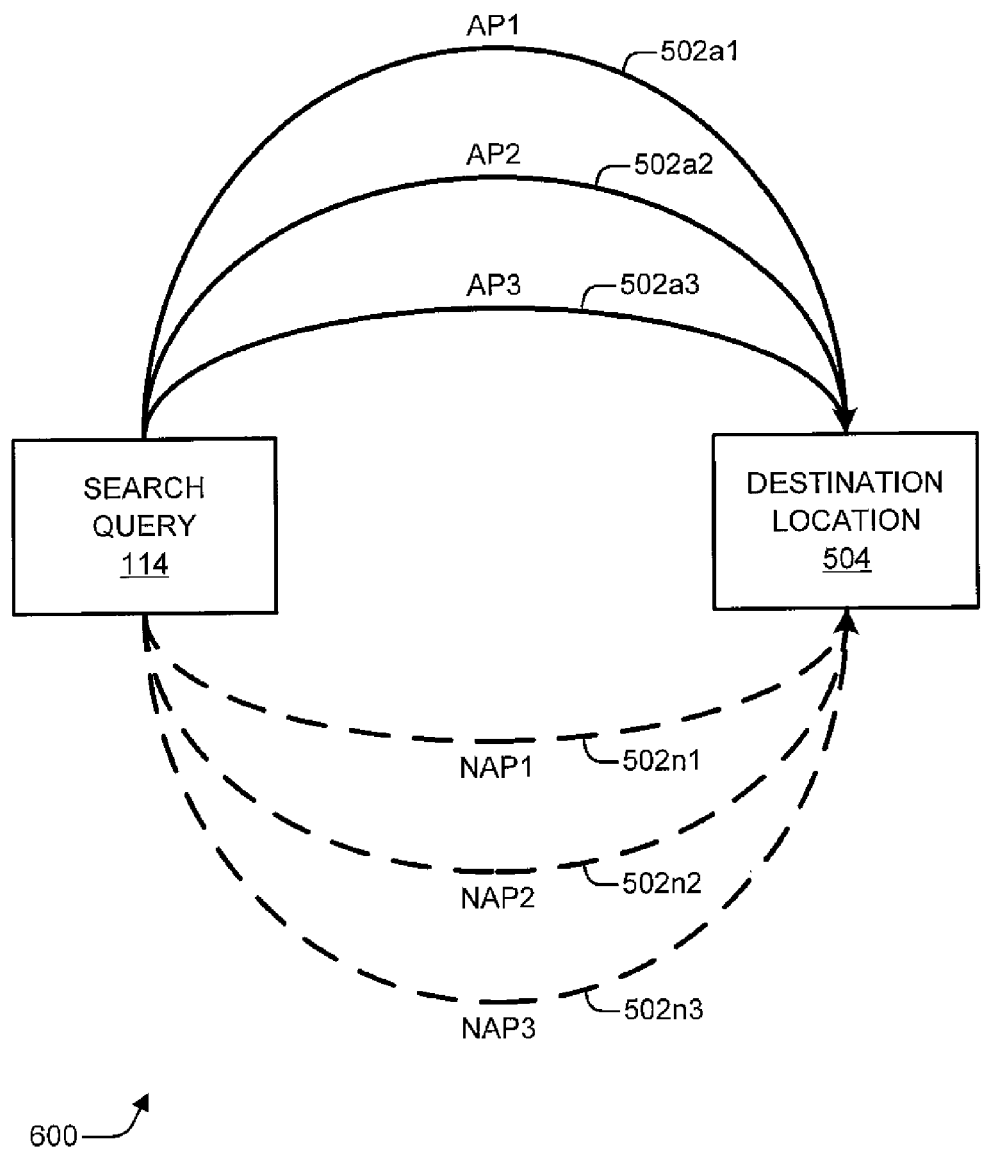
FIG. 6 is a schematic diagram illustrating competing search paths, such as in accordance with an embodiment.

FIG. 6 is a schematic diagram 600 illustrating multiple example competing or competitive search paths that may extend between a search query and a destination location, such as according to an embodiment. As illustrated, example graph 600 may include search query 114, destination location 504, and multiple search paths 502. More specifically, example 600 may include three assisted search paths 502a1, 502a2, or 502a3, which are depicted as solid lines ("AP1", "AP2", or "AP3"), or three non-assisted search paths 502n1, 502n2, or 502n3, which are depicted as dashed lines ("NAP1", "NAP2", or "NAP3"). As shown, search paths 502 start from search query 114 and terminate at destination location 504.

For an example embodiment, a search path 502 may comprise an assisted search path 502a or a non-assisted search path 502n. By way of example, but not limitation, an assisted search path 502a may comprise a search path 502 that includes a user interaction of selecting a search suggestion. By way of example, but not limitation, a non-assisted search path 502n may comprise a search path 502 in which a search suggestion is not selected.

As shown, multiple assisted search paths such as, 502a1, 502a2, or 502a3, may include a corresponding initiated search query 114 and a corresponding destination location 504. Multiple non-assisted search paths such as, 502n1, 502n2, or 502n3, may likewise include a corresponding initiated search query 114 and a corresponding destination location 504. Alternate search paths with corresponding initiated search queries and destination locations are referred to here as competing or competitive since the paths represent alternate paths capable of being traversed between 114 and 504, for example. However, some paths may be longer in time duration, for example. Likewise, search paths in which search suggestion are selected, such as for assisted search paths, such as 502a, for example, may be evaluated by reference or comparison with competitive non-assisted search paths such as, 502n, for an embodiment.

Figure 7:
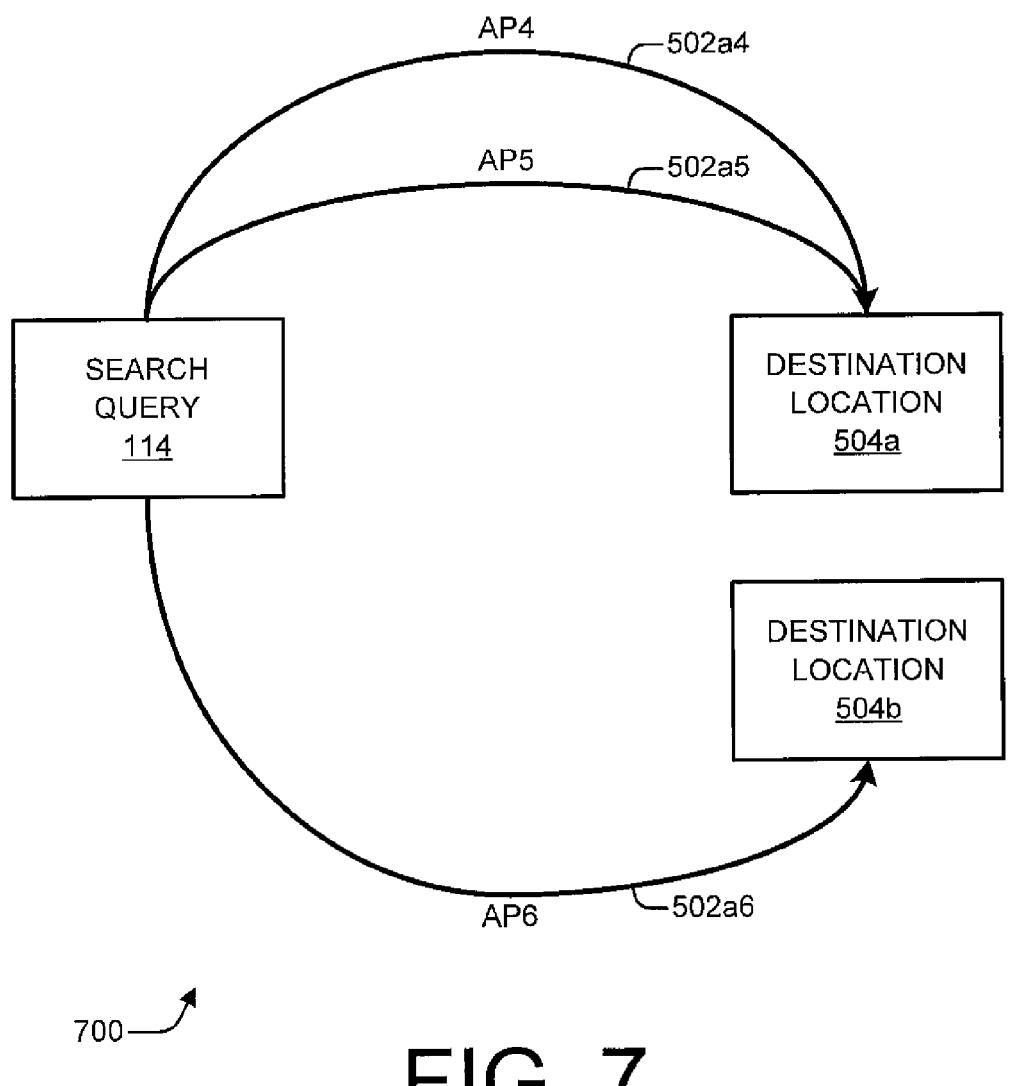
FIG. 7 is a schematic diagram illustrating non-competing search paths, such as in accordance with an embodiment.

FIG. 7 is a schematic diagram 700 illustrating multiple example non-competing or non-competitive search paths that may extend between a search query and destination locations, such as according to an embodiment, for example. As illustrated, example 700 may include search query 114, destination locations 504, and search paths 502. More specifically, example 700 includes two destinations, 504a and 504b. Example 700 also includes three assisted search paths such as, 502a4, 502a5, or 502a6, which are depicted as solid lines ("AP4", "AP5", or "AP6"). As shown, search paths 502 start from search query 114 and terminate at a destination location, such as 504. For this example, one or more assisted search paths such as, 502a, may not have corresponding destination locations. Thus, assisted search paths 502a may not have a corresponding competitive non-assisted search path. An assisted search path may be considered a non-competitive or non-competing search path if there is no non-assisted search path having a corresponding initiated search query and a corresponding destination location.

Assisted search paths such as, 502a4, 502a5, or 502a6, may, therefore, for an example embodiment, be considered non-competitive search paths. As shown, assisted search paths, such as 502a4 or 502a5, may begin with search query 114 and end with destination 504a. Assisted search path 502a6 may begin with search query 114 and end with destination 504b. Search paths 502a4, 502a5, or 502a6 here are assisted by including selection of a search suggestion during search path traversal between search query 114 and destination 504a or destination 504b. In this context, search suggestions or query recommendations may be categorized in some instances as comprising a lateral search suggestion or a non-lateral search suggestion. As used herein, a lateral search suggestion or lateral query recommendation may comprise a search suggestion or query recommendation that is part of a non-competitive assisted search path. As used herein, therefore, a non-lateral search or query suggestion or a competitive search or query suggestion may comprise a search or query suggestion that is part of a competitive assisted search path.

For an example embodiment, metrics may be employed to evaluate search suggestions. Three example metrics are described, although many other metrics are possible and may be included in claimed subject matter, such as other path gain/loss (PGL) metrics. In an embodiment, path gain loss metrics may comprise PGL0, PGL1, or PGL2. PGL0 corresponds to a general path gain-loss metric, referred to previously and discussed as PGL, for example. In contrast, PGL1 or PGL2 comprise path gain-loss metrics that may be employed to obtain a more detailed view of path gain-loss associated with one or more query recommendations, for example. In an example embodiment, to compute a PGL metric, such as PGL0, competitive search paths may be identified, such as previously described. For example, for an embodiment, at least two types of search paths may be identified: assisted search paths or non-assisted search paths. Time distributions may be compared for these two types of search paths to evaluate one or more query recommendations, for example.

In an embodiment, non-assisted search paths may be sorted by path time, for example. A path time at a 20th percentile level, for example, may be chosen as a pivotal path time in an embodiment. A $20^{th}$ percentile level may imply that assisted search paths are to be faster than 80% of non-assisted search paths on average. However, claimed subject matter is, of course, not limited to any particular percentile level. A path time for an assisted search path may be compared against a pivotal threshold time, such as a pivotal path time, for non-assisted search paths on average, in one embodiment. If a path time of an assisted search path is shorter, in one embodiment, it may be counted as a gain point for a clicked or selected search suggestion. If a path time of an assisted search path is longer, in an embodiment, it may be counted as a loss point for a clicked or selected search suggestion. Likewise, gain or loss counters for search suggestions may be computed. A path gain or loss may be evaluated for a starting search query and an ending destination, as observed in a search session logs, for example. Gain or loss counts may be aggregated across clicked search suggestions to obtain gain or loss counts. Gain or loss counts may therefore indicate search suggestion performance in an embodiment. A PGL0 metric may be generated, for example, in accordance with the following relation:

$$PGL0 = \text{gain count}/(\text{gain count} + \text{loss count}).$$

Likewise, in an embodiment, path gain loss metrics may be computed for particular situations, such as by aggregating gain or loss counts across multiple search suggestions and computing a per-query metric, a per-category metric, etc. As mentioned, additional path gain-loss metrics, such as PGL1 or PGL2, may also be computed. For example, for an example embodiment, but without limitation, one metric, such as PGL1, may measure a utility of competing search suggestions. Another metric, such as PGL2, may measure performance of lateral search suggestions.

In an example embodiment, to compute a PGL1 metric, a set of competitive paths may be identified, as previously discussed, for example. However, for a metric of utility of competing search suggestions, such as PGL1, for example, assisted paths that do not have non-assisted path counterparts are omitted. A PGL1 metric may be generated using an approach similar to PGL0, such as:

$$PGL1 = \text{gain count}/(\text{gain count} + \text{loss count}).$$

A PGL1 metric may focus at least partially on search suggestions that have at least one competing non-assisted search path. Evaluations using a metric, such as PGL1, imply that in some instances competing search suggestions may reduce rather than increase efficiency or at least that using competing search suggestions may be less efficient than using lateral suggestions, on average. For example, PGL1 metric values may be lower than PGL2 metric values.

In an example embodiment, a metric may be employed for performance of lateral query recommendations, such as a PGL2 metric. A PGL2 metric may measure a performance of lateral suggestions. For lateral suggestions, search paths may be evaluated and gain or loss may be computed as follows, for example. A gain count may be increased if an assisted search path leads to a destination location. A loss count may be increased if an assisted search path is abandoned or otherwise does not lead to a destination location. By way of example, for an embodiment, as discussed, a dwell time corresponding to 100 seconds or longer may be employed to identify a destination location. A PGL2 metric may be generated in a manner similar to PGL0 and PGL1, as follows.

$$PGL2 = \text{gain count}/(\text{gain count} + \text{loss count}).$$

As indicated, metric values for lateral suggestions, such as PGL2, appear to be higher than metric values for competing suggestions, such as PGL1. It may be that a non-competing or lateral search suggestion may improve efficiency for a search query better than a competing search suggestion, therefore. For example, search assistance, such as providing query recommendations, in one or more embodiments, may be adjusted to offer more lateral search suggestions than competing search suggestions on a relative basis, although, of course claimed subject matter is not limited in scope in this respect. For example, a search suggestion generation process may be adjusted to produce 70% lateral search suggestions, for instance, instead of producing 45% lateral search suggestions. Of course, again, this is merely an illustrative example. Claimed subject matter is not limited in this respect, of course.

As another illustrative example, for an embodiment, search suggestions with relatively low metric values (e.g., PGL0<0.3) may be omitted for a corresponding query search. Likewise, search suggestions with relatively higher metric values may be elevated above or promoted for use over search suggestions with relatively lower values. Generation of metrics or evaluation of search suggestions using metrics may be aggregated, as previously indicated, along a variety of categories, for example, on a per search suggestion basis, on a per query basis, etc.

Figure 8:
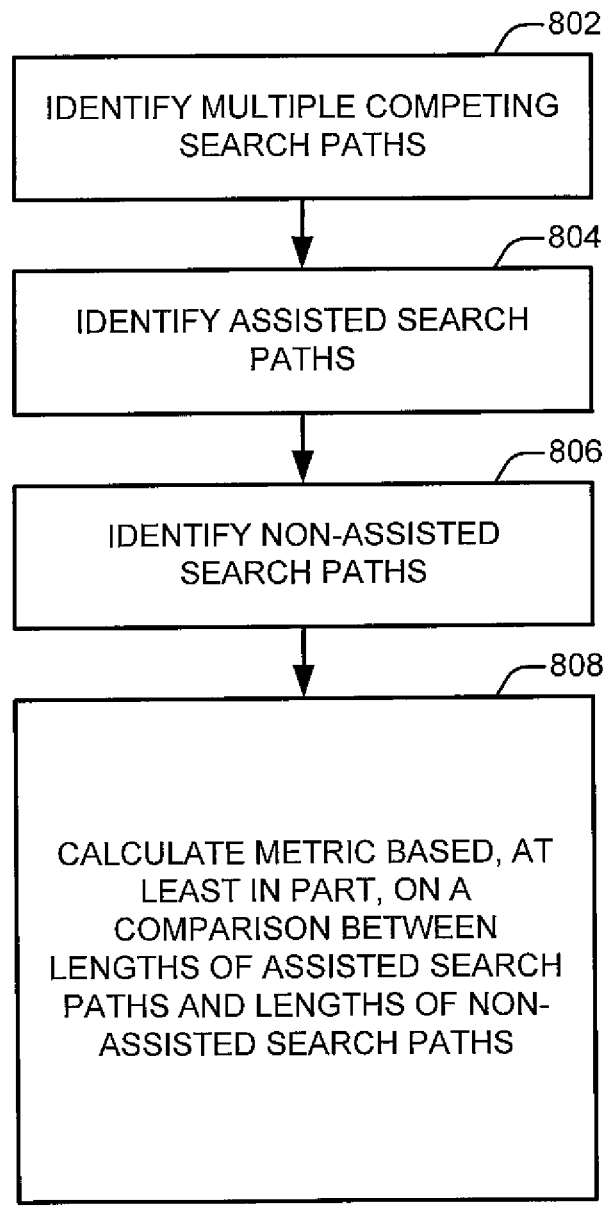
FIG. 8 is a flow diagram illustrating an example method for generating a metric, such as in accordance with an embodiment.

FIG. 8 is a flow diagram 800 that illustrates an example method for generating a metric, such as in accordance with an embodiment. As illustrated, flow diagram 800 may include any of operational blocks 802-808. Although operations 802-808 are shown and described in a particular order, it should be understood that methods within the scope of claimed subject may employ an alternative order or alternative operations. Likewise, for an embodiment, operations of flow diagram 800 may be performed so as to be fully or partially overlapping with each other or other operations not illustrated. In an embodiment, one or more of operations 802-808 may be performed at least partially by one or more computing platforms such as distributed system of servers, as one example.

At operation 802, multiple competing search paths that start from a corresponding search query and terminate at a corresponding destination may be identified. At operation 804, from multiple competing search paths, assisted search paths that include selection of one or more search suggestions may be identified. At operation 806, from multiple competing search paths, non-assisted search paths that do not include a selection of a search suggestion may be identified.

At operation 808, a metric may be generated based, at least in part, on comparisons between lengths of assisted search paths and lengths of non-assisted search paths. In an example embodiment, generation of a metric may further include sorting non-assisted search paths into a list based, at least in part, on lengths of non-assisted search paths to assess a of percentiles, for example.

In an example embodiment, a metric may comprise a path gain-loss metric. Generation of a metric may further include determining a path gain-loss metric at least partially by incrementing a gain count if a length of a particular assisted search path of identified assisted search paths is less than a threshold time, for example, or by increasing a loss count if the length of the particular assisted search path is greater than a threshold time, for example. Note also that in some embodiments these thresholds may not necessarily be the same. For example, a gain time threshold may be different than a loss time threshold.

For certain example implementations, a path gain loss metric, such as a PGL0 metric, a PGL1 metric, or a PGL2 metric, for example, may be calculated using session or search logs. Example implementations for generating embodiments of a path gain loss metric, for example, are described further herein below. However, claimed subject matter is not limited in these respects or to any particular metric or metrics. These are merely illustrative examples.

Procedures described herein may be implemented using a system of distributed computing platforms, as previously mentioned. By way of example but not limitation, procedures may be implemented using cloud or grid computing technology to handle large memory or computational demands, for example. A search path may be identified using, for example, a procedure as follows:

1. For a search history found in one or more search logs:
    a. Query or click events may be sorted by timestamps. Results of timestamp sorting may include one or more raw search paths. A raw search path may comprise a path that includes several search sessions for related or unrelated search queries.
    b. A raw path may be broken into shorter paths as follows:
        i. Period of inactivity among search events: A time interval between a search submission query and a preceding event in a raw path may be evaluated. If a time interval is greater than an inactivity threshold (e.g., five minutes), a latter query may be treated as a beginning of another search path. A search query submission after, e.g., five minutes of inactivity, be associated with different search intentions as compared to a preceding search query submission, although claimed subject matter is not limited in scope in this respect.
        ii. Greater than a time threshold on a search result: A dwell time for a search result may be computed by subtracting a timestamp for the click from a timestamp of a subsequent event. If a search result click is found whose dwell time is greater than a dwell time threshold (e.g., that is larger than 100 seconds), the location may be treated as a destination location (or a last event) of a search path. Another search path starting from a subsequent search query submission may be started.
        iii. For a final event in a raw path, there may be no subsequent event recorded in a search log. For final events, a dwell time of a final event is greater than a dwell time threshold.
    c. Sub-paths produced via the above processing may be stored.
2. For search paths identified in 1 above, there may be at least two types of search paths: those with a destination or those without a destination
    a. For those search paths with a destination, paths may end at a search result click having its dwell time greater than a dwell time threshold (e.g., a page dwell time over 100 seconds). A last click may be deemed to comprise a destination.
    b. For those search paths without a destination, paths may end on a final location having a dwell time less than a dwell time threshold.

In an example implementation, a path gain/loss (PGL) metric may be generated. For example, a baseline or general "PGL0" metric may be generated, such as using a procedure as follows, in an embodiment:

1. Filter or remove search paths without a destination. Search paths with a destination may be handled as follows in an embodiment:
2. identify competitive search paths. To do so, identify combinations of a starting query and a destination from a collection of search paths. For an identified pair, e.g., <starting query, destination>, combination, retrieve paths with a corresponding starting query and destination. A collection of competitive search paths may be grouped together.
3. For a competitive path group identified in 2, classify search paths into at least two classes: assisted search paths or non-assisted search paths.
    If a search path includes a click or selection of a search suggestion, a corresponding search path may be termed an assisted search path.
    If a search path does not include a click or selection of a search suggestion, a search path may be termed a non-assisted search path.
    For non-assisted paths, sort search path by path time. A path time, for an embodiment, may be determined based, at least in part, on a timestamp difference of a destination and an initiating search query (e.g., path time=timestamp(destination)−timestamp(first query)). From sorted search paths, a path at a given percentile point, such as a 20th percentile point, may be identified. This path may be termed a pivotal path. A path time associated with a pivotal path may be termed a pivotal search time. A different percentile level for determining a pivotal path may be employed in alternate embodiments, of course. A smaller percentile level may imply a more improved efficiency for a search suggestion.

For an assisted search path, compare a path time versus a pivotal search time. If a path time of a given assisted path is smaller than a pivotal search time, credit one gain to a selected search suggestion on a given assisted search path. Otherwise, one loss may be debited to a the selected search suggestion. For a search suggestion for a particular initiating search query and destination, a gain counter or a loss counter may be maintained. For example, gain or loss counters may be implemented as follows:

Gain(S,Q,U): A gain counter may track a gain count of a particular search suggestion S by evaluation of search paths that start from a corresponding query Q and end at a corresponding destination U.

Loss(S,Q,U): A loss counter may track a loss count of a particular suggestion S by evaluation of search paths that start from a corresponding query Q and end at a corresponding destination U.

For an assisted search path (e.g., paths that start from a corresponding query Q and end at a corresponding destination U)

If there are zero non-assisted paths with a corresponding initiating query Q and destination U, then A pivotal search time may be set to be large (e.g., so large that other times in comparison are less to reflect that non-assisted search paths would take a long time to reach a corresponding destination.)

For a clicked or selected search suggestion (say, S) that appears on an assisted search path, If a path time of an assisted path is smaller than (or equal to) a pivotal search time, then Gain(S,Q,U) may be increased by one Otherwise, Loss(S,Q,U) may be increased by one.

A list of updated gain or loss counters for multiple search suggestions that appear on assisted search paths may be produced.

4. Aggregate gain or loss counts for a search suggestion across available destinations given a corresponding initiating query. For example, compute a per-suggestion metric, such as PGL0, as follows:

Given a list of gain or loss counts as computed in 3 above:

For a suggestion S and an initiating query Q, compute as follows:

a aggregate gain counters across available destinations $$\text{Gain}(S, Q) = \sum_u \text{Gain}(S, Q, u)$$

aggregate loss counters across available destinations.

$$\text{Loss}(S, Q) = \sum_u \text{Loss}(S, Q, u)$$

A resulting per-suggestion metric, such as PGL0, may be computed as follows:

$$PGL0(S, Q) = \frac{\text{Gain}(S, Q)}{\text{Gain}(S, Q) + \text{Loss}(S, Q)}$$

Store or report computed PGL0(S,Q) values for multiple <query,suggestion> pairs.

5. Similarly, compute per-query PGL0 values by aggregating PGL values across multiple search suggestions. Specifically compute per-query PGL values as follows:

Given a list of gain or loss counts as computed in 3 above:

A per-query PGL0 may be computed via aggregation:

Aggregate gain counters across available destinations and search suggestions.

$$\text{Gain}(Q) = \sum_s \sum_u \text{Gain}(s, Q, u)$$

It may aggregate loss counters across available destinations and search suggestions.

$$\text{Loss}(Q) = \sum_s \sum_u \text{Loss}(s, Q, u)$$

A resulting per-query PGL0 may be computed as follows:

$$PGL0(Q) = \frac{\text{Gain}(Q)}{\text{Gain}(Q) + \text{Loss}(Q)}$$

Provide computed metrics, such as PGL0(Q) values, for multiple queries.

6. To compute a per-category metric, PGL0, identify whether a search suggestion click is from a target category. Those suggestions clicked from a target category may participate in a per-category metric calculation. For example, a PGL0 value for a category, M, which is denoted as PGL0(M) herein below, may be computed. Operation 3 above may be revised for gain or loss counters as follows:

Given a set of assisted search paths or non-assisted search paths as computed in 3 above:

For an assisted search path (e.g., that starts from a corresponding query Q and ends at a corresponding destination U):

For a clicked or selected search suggestion (say, S) that appears on an assisted search path, If a search suggestion click is not from category M, then skip the suggestion. A skipped suggestion may not contribute to gain or loss counts.

Similarly, compare a path time of an assisted search path versus a pivotal search time to update gain or loss counters:

a. Gain(S,Q,U,M)
b. Loss(S,Q,U,M)

Given updated gain or loss counts for a search suggestion with respect to a target category, M, compute an per-metric, such as PGL0, as follows:

A per-category gain may be computed:

$$\text{Gain}(M) = \sum_s \sum_q \sum_u \text{Gain}(s, q, u, M)$$

Aggregate across available destinations, search suggestions, and search queries for a gain calculation An per-category loss may be computed:

$$\text{Loss}(M) = \sum_s \sum_q \sum_u \text{Loss}(s, q, u, M)$$

A resulting per-category or category-level metric value, such as aPGL0 value, may be computed as follows:

$$PGL0(M) = \frac{\text{Gain}(M)}{\text{Gain}(M) + \text{Loss}(M)}$$

In an example implementation, a path gain/loss (PGL) metric may be generated. For example, a PGL1 metric that focuses at least partially on competitive search paths may be generated in an embodiment, using a procedure as follows:

1. Operation 1 for PGL1 may mirror operation 1 above for PGL0.
2. Operation 2 for PGL1 may mirror operation 2 above for PGL0.
3. For a competitive path group identified as described above, classify its member search paths into at least two classes: assisted search paths or non-assisted search paths.

To participate in a PGL1 calculation, competitive path groups having non-zero assisted search paths may be selected. For example, the following checks may be performed:

Check if a number of assisted search paths is greater than zero:
   If a number is zero, a corresponding competitive path group may be skipped and processing may be continued with a next competitive path group.
   If a number is greater than zero, a pivotal search path or a pivotal search time may be computed as described above for a metric, such as PGL0. Corresponding groups of competitive paths may contribute to gain or loss counts.

Other operations for determining a metric value, such as PGL1, may be analogous to those for another PGL metric, such as PGL0. A list of Gain(S,Q,U) or Loss(S,Q,U) counts as determined by evaluating competitive paths in search logs may be reported or stored.

4. Operations 4, 5, or 6 for per-suggestion, per-query, or per-category metrics, such as PGL1 calculations, respectively, may be implemented analogously to those operations described above for metric calculations, such as PGL0 calculations.

In an example implementation, a path gain/loss (PGL) metric may be generated. For example, a metric, such as PGL2, for example, that focuses at least partially on non-competitive assisted search paths may be generated. For an embodiment, a PGL2 metric may consider those assisted paths that may be skipped by a PGL1 metric. In contrast with certain examples for a PGL1 metric, a PGL2 metric may take into account search paths for search suggestions that do not reach a destination location. A PGL2 metric, such as for an embodiment, may be generated using, for example, a procedure as follows:

1. Identify groups of competitive paths from search paths that reach a destination location.
2. For a competitive path group, classify member paths into at least two classes: assisted search paths or non-assisted search paths.

A competitive path group may be skipped if at least one non-assisted search path exists.

Remaining assisted search paths may be reported or stored. For reported or stored assisted paths, there may be no corresponding non-assisted path to a corresponding destination.

3. For remaining assisted paths or search paths that do not reach a destination, evaluate clicked or selected search suggestions along a path that includes a dwell time for a final selection. Gain or loss counters may be updated as follows:

For a search suggestion on a search path that starts from query Q and ends at a location U:
   If a dwell time at location U is smaller than a threshold (e.g., 100 seconds), then
   A Loss(S,Q,U) counter may be increased by one.
   Otherwise, if a dwell time at location U is greater than or equal to a threshold (e.g., 100 seconds), then
   A Gain(S,Q,U) counter may be increased by one.

Gain or loss counts that are computed after evaluating search paths (e.g., including those without a destination) may be reported or stored.

4. Compute a per-suggestion metric, such as PGL2, by aggregating across destinations:

Gain counters may be aggregated across destinations.

$$\text{Gain}(S, Q) = \sum_u \text{Gain}(S, Q, u)$$

Loss counters may be aggregated across destinations.

$$\text{Loss}(S, Q) = \sum_u \text{Loss}(S, Q, u)$$

A per-suggestion metric, such as PGL2, may be computed using:

$$PGL2(S, Q) = \frac{\text{Gain}(S, Q)}{\text{Gain}(S, Q) + \text{Loss}(S, Q)}$$

5. Compute a per-query PGL2 as follows:
   Gain counters may be aggregated across destinations and suggestions.

$$\text{Gain}(Q) = \sum_s \sum_u \text{Gain}(s, Q, u)$$

Loss counters may be aggregated across destinations and suggestions.

$$\text{Loss}(Q) = \sum_s \sum_u \text{Loss}(s, Q, u)$$

A per-query metric, such as PGL2, may be computed using:

$$PGL2(Q) = \frac{\text{Gain}(Q)}{\text{Gain}(Q) + \text{Loss}(Q)}$$

6. Compute a per-category metric, such as PGL2, by filtering out those search suggestion clicks that are not associated with a target category M. An aggregating process may be performed analogously to that for a metric PGL0 calculation, such as in operation 6 as described above. Suggestions clicked that are irrelevant to a target category M may be filtered out:
For remaining search suggestions clicked, Gain(S,Q, U,M) counters or Loss(S,Q,U,M) counters may be computed as follows:
Gain may be computed for a given category M with:

$$\text{Gain}(M) = \sum_s \sum_q \sum_u \text{Gain}(s, q, u, M).$$

Loss may be computed for a given category M with:

$$\text{Loss}(M) = \sum_s \sum_q \sum_u \text{Loss}(s, q, u, M).$$

A per-module PGL2 metric may be computed using:

$$PGL2(M) = \frac{\text{Gain}(M)}{\text{Gain}(M) + \text{Loss}(M)}.$$

Figure 9:
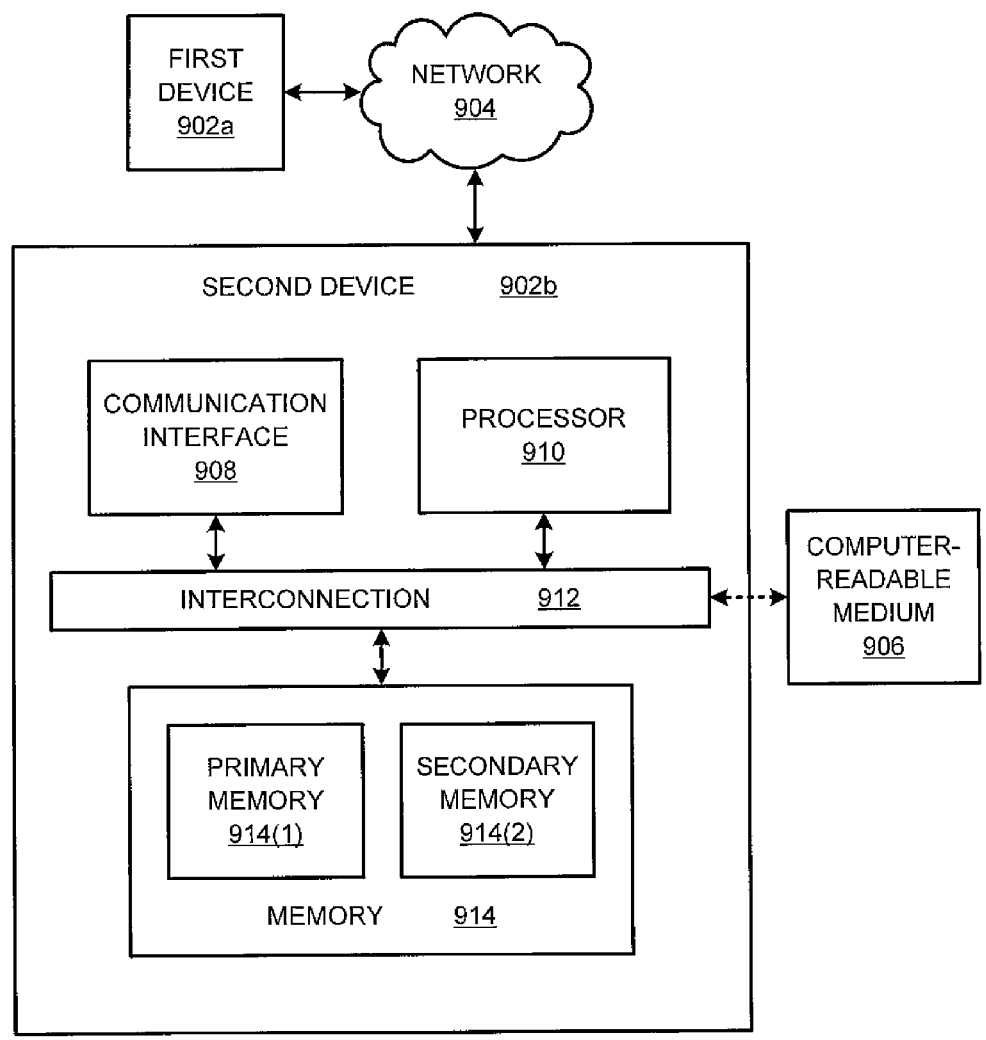
FIG. 9 is a schematic diagram illustrating a possible computing environment that may be employed in connection with an implementation of an embodiment.

FIG. 9 is a schematic block diagram 900 of example devices, according to an embodiment, that may realize at least one computing platform to implement one or more aspects of search suggestions that are described herein. As illustrated, block diagram 900 may include a first device 902a or a second device 902b, which may be operatively coupled together via one or more networks 904. A device 902 may comprise, correspond to, implement, or realize at least part of search suggestion resources 402, user resources 406 (e.g., both of FIG. 4), or a combination thereof, etc. Network 904 may correspond to communications network 404 (e.g., of FIG. 4).

For certain example embodiments, first device 902a may be adapted at least to receive entered search terms or selections of user interface links from a user or to provide search results, search suggestions, or web documents to a user. Network 904, as shown in FIG. 9, may be representative of one or more communication links, processes, or resources capable of supporting an exchange of signals between first device 902a and second device 902b. Second device 902b may be adapted at least to generate search suggestions or a metric indicative of a characteristic of a search suggestion.

As illustrated, but by way of example only, second device 902b may include at least one communication interface 908, one or more processors 910, at least one interconnection 912, or at least one memory 914. Memory 914 may include at least a primary memory 914(1) or a secondary memory 914(2). Second device 902b may have access to at least one computer-readable medium 906. Although not explicitly shown, first device 902a may also include any components illustrated with regard to second device 902b.

For an example embodiment, but not by way of limitation, second device 902b may include at least one processor 910 that is operatively coupled to memory 914 via interconnection 912. Memory 914 may comprise any data storage mechanism. Although not explicitly shown in FIG. 9, memory 914 may store or include instructions. Instructions stored in memory 914 may be executable by processor 910 to perform, for example, at least a portion of one or more procedures, methods, or any combination thereof, etc. that are described herein. Although illustrated in this example as being separate from processor 910, it should be understood that at least a part of memory 914 may be provided within or otherwise co-located with or coupled directly to processor 910.

As shown, second device 902b may be coupled to or have access to a computer-readable medium 906. A computer-readable medium may include, for example, any medium that can store, carry, or make accessible data, code, or instructions for execution by one or more devices in block diagram 900. Additionally or alternatively, a computer-readable medium 906 may comprise at least a portion of memory 914.

Second device 902b may also include, for example, a communication interface 908 that may provide for or otherwise support an operative coupling of second device 902b to at least network 904. By way of example but not limitation, communication interface 908 may include a network interface device or card, a modem, a router, a switch, a transceiver, or any combinations thereof, etc., just to name a few examples. Electrical digital signal(s) (not shown) may be manipulated by second device 902b. By way of example but not limitation, electrical digital signals may be received from or transmitted onto network 904 using communication interface 908. Additionally or alternatively, electrical digital signals may be stored to or read from memory 914 using interconnection 912.

According to embodiments that include at least one memory, one or more portions of memory 914 may store signals representative of data or information as expressed by a particular state of memory 914. For example, an electronic digital signal representative of data or information may be "stored" in a portion of a memory device by affecting or changing a state of such portions of memory 914 to represent data or information as binary information (e.g., as ones and zeros). As such, in a particular implementation, a change of state of a portion of memory to store a digital signal representative of data or information may constitute a transformation of memory 914 to a different state or thing.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. By way of example but not limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing description is intended to provide illustrative examples.

A storage medium may be non-transitory or comprise a non-transitory device. In this context, a non-transitory storage medium may include a device that is tangible, meaning that the device has a concrete physical form, although the device may change its physical state. Thus, for example, non-transitory may refer to a device that remains tangible despite a change in state.

It will, of course, also be understood that, although particular embodiments have been described, claimed subject matter is not limited in scope to a particular embodiment or implementation. For example, one embodiment may be in hardware, such as implemented with a device or combination of devices, as previously described, for example. Likewise, although claimed subject matter is not limited in scope in this respect, an embodiment may comprise one or more articles of manufacture, such as a storage medium or storage media, for example, that may have stored thereon instructions executable by a specific or special purpose system or apparatus. As one potential example, a specific or special purpose computing platform may include one or more processing units or processors; one or more input/output devices, such as a display, a keyboard or a mouse; one or more memories, such as static random access memory, dynamic random access memory, flash memory, or a hard drive; or any combination thereof; etc. Although, again, claimed subject matter is not limited in scope to this example.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like may include a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," "generating," "evaluating," "obtaining," "ascertaining," "comparing," "transmitting," "receiving," "identifying," "providing," "initiating transmission," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an example embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and" and "or" as used herein may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes, or equivalents will now occur to those skilled in the art. It is, therefore, to be understood that the appended claims are intended to cover all such modifications or changes as fall within the true spirit of claimed subject matter.

What is claimed is:

1. A method comprising:
   computing via one or more computing platforms a metric corresponding to a search query and a search query recommendation based, at least in part, on lengths of search paths to a destination location to determine at least whether search assistance is likely to improve search path efficiency, wherein said search paths comprise a sequence of selected search results generated between initiation of said search query until reaching said destination location, and
   wherein said metric comprises a path gain-loss metric indicative of gain-loss attributable to said search query recommendation, said path gain-loss metric is determined by comparing at least one assisted search path comprising said search query and said destination location with at least one non-assisted search path comprising said search query and said destination location, accruing a gain point where said at least one assisted search path is shorter than said at least one non-assisted search path, and accruing a loss point where said at least one assisted search path is longer than said at least one non-assisted search path, wherein said at least one assisted search path and said at least one non-assisted search path are from a search log, and further wherein said at least one assisted search path is based, at least in part, on said search query recommendation.

2. The method of claim 1, wherein said search paths to said destination location include search paths that result from user interactions with delivered search query results.

3. The method of claim 1, wherein said destination location comprises a user selected search result in which a user dwells on the user selected search result for a period of time above a threshold.

4. The method of claim 1, further comprising: determining whether to provide said search query recommendation based, at least in part, on said computed metric.

5. A system comprising: one or more computing platforms; said one or more computing platforms to determine whether to provide search assistance for a search query to improve search path efficiency, said determination to be based, at least in part, on a path gain-loss metric indicative of gain-loss attributable to a search query recommendation, said path gain-loss metric to be determined at least partially by a comparison between at least one assisted search path to comprise said search query and a destination location and at least one non-assisted search path to comprise said search query and said destination location, a gain point to be accrued where said at least one assisted search path is shorter than said at least one non-assisted search path, and a loss point to be accrued where said at least one assisted search path is longer than said at least one non-assisted search path; wherein said at least one assisted search path is to be based, at least in part, on said search query recommendation, and said at least one assisted search path and said at least one non-assisted search path to be from a search log.

6. The system of claim 5, wherein said one or more computing platforms comprise one or more servers.

7. The system of claim 5, wherein a length of said at least one assisted search path and a length of said at least one non-assisted search path to comprise measurements of time periods.

8. The system of claim 5, wherein said comparison between said at least one assisted search path and said at least one non-assisted search path to include computing a metric corresponding to lateral query recommendations for said search query.

9. The system of claim 5, wherein said one or more computing platforms comprise a distributed computing system.

10. An article comprising:
a non-transitory storage medium having instructions stored thereon executable by a special purpose computing platform to:
evaluate one or more query recommendations for a submitted search query; wherein said one or more query recommendations to comprise at least one of a lateral query recommendation or a competing query recommendation,
wherein the lateral query recommendation is to comprise a query recommendation that is part of a non-competitive assisted search path that comprises an assisted search path having no corresponding non-assisted search path including a corresponding initiated search query and a corresponding destination location, and
compute a path gain-loss metric attributable to said lateral query recommendation, said path gain-loss metric to comprise a gain count to be accrued if an assisted search path leads to said corresponding destination location and a loss count to be accrued if an assisted search path is abandoned or is determined to not lead to a destination location, wherein said assisted search path is to be from a search log and is to be based, at least in part, on said lateral query recommendation.

11. The article of claim 10, wherein said instructions executable by said special purpose computing platform to further: provide one or more evaluated query recommendations for said submitted search query if one or more evaluated query recommendations are indicated to provide improved path length efficiency based at least in part on the evaluation.

12. The article of claim 11, wherein said instructions executable by said special purpose computing platform to further: provide a lateral query recommendation for said one or more evaluated query recommendations.

13. The article of claim 10, wherein said instructions executable by said special purpose computing platform to further: provide multiple query recommendations if multiple evaluated query recommendations are indicated to provide improved path length efficiency based at least in part on the evaluation.

14. The article of claim 13, wherein said instructions executable by said special purpose computing platform to further: provide a lateral query recommendation for at least one of said multiple query recommendations.

15. The article of claim 13, wherein said instructions executable by said special purpose computing platform to further: provide more lateral query recommendations than non-lateral query recommendations for said multiple query recommendations.

16. An apparatus comprising: a computing platform;
said computing platform to display a graphical user interface comprising a search result area to display search results and a query recommendation area to display one or more query recommendations after a determination whether a query recommendation is likely to improve search path efficiency,
wherein said one or more displayed query recommendations are to be based, at least in part, on a path gain-loss metric indicative of gain-loss attributable to said query recommendation, said path gain-loss metric to be determined by a comparison between at least one assisted search path to comprise a search query and a destination location with at least one non-assisted search path to comprise said search query and said destination location, wherein a gain point is to be accrued where the at least one assisted search path is shorter than the at least one non-assisted search path, and wherein a loss point is to be accrued where the at least one assisted search path is longer than the at least one non-assisted search path, wherein said at least one assisted search path and said at least one non-assisted search path are to be from a search log, and further wherein said at least one assisted search path is to be based, at least in part, on said query recommendation.

17. The apparatus of claim 16, wherein said graphical user interface includes more than one query recommendation area.

18. A method comprising:
computing via one or more computing platforms a metric corresponding to a search query and a search query recommendation based, at least in part, on lengths of search paths to a destination location to determine at least whether search assistance is more likely to improve search path efficiency, wherein said search paths comprise a sequence of selected search results generated between initiation of said search query until reaching said destination location;

wherein said metric comprises a path gain-loss metric indicative of gain-loss attributable to said search query recommendation, said path gain-loss metric is determined by comparing lengths of assisted search paths comprising said search query and said destination location with lengths of non-assisted search paths comprising said search query and said destination location;

filtering out, from a search log, search paths having no destination location;

identifying competitive search paths from said filtered search paths, said competitive search paths comprising said search query and said destination location;

grouping said identified competitive search paths into a group of assisted search paths and a group of non-assisted search paths, wherein assisted search paths comprise search paths that include traversing one or more query recommendations of the search paths and wherein non-assisted search paths comprise search paths that do not include traversing a query recommendation;

sorting non-assisted search paths by path time to determine a pivotal threshold time;

comparing a path time of assisted search paths with the determined pivotal threshold time;

counting a gain point in response to assisted search paths with a path time shorter than said pivotal threshold time;

counting a loss point in response to assisted search paths with a path time greater than said pivotal threshold time; and aggregating gain and loss counts and basing said computed metric at least in part on said aggregated gain and loss counts.

19. The method of claim 18, wherein said pivotal threshold time corresponds to a path time at a 20th percentile level of said sorted non-assisted search paths such that said path time at said 20th percentile level is less than a path time of 80% of said sorted non-assisted search paths.

\* \* \* \* \*